United States Patent
Park et al.

(10) Patent No.: US 8,518,582 B2
(45) Date of Patent: Aug. 27, 2013

(54) CATHODE COMPRISING ACTIVE MATERIAL COMPOSITE AND LITHIUM BATTERY USING THE SAME

(75) Inventors: Kyu-sung Park, Yongin-si (KR); Jae-gu Yoon, Yongin-si (KR); Seok-gwang Doo, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1095 days.

(21) Appl. No.: 12/103,915

(22) Filed: Apr. 16, 2008

(65) Prior Publication Data

US 2008/0311432 A1 Dec. 18, 2008

(30) Foreign Application Priority Data

Jun. 12, 2007 (KR) .................. 10-2007-0057441

(51) Int. Cl.
*H01M 4/48* (2010.01)
*H01M 4/52* (2010.01)

(52) U.S. Cl.
USPC .............. 429/223; 429/224; 429/231.95

(58) Field of Classification Search
USPC ................... 429/231.95, 223, 224
See application file for complete search history.

(56) References Cited

U.S. PATENT DOCUMENTS

| | | | |
|---|---|---|---|
| 6,677,082 B2 | 1/2004 | Thackeray et al. | |
| 6,680,143 B2 | 1/2004 | Thackeray et al. | |
| 6,753,111 B2 | 6/2004 | Kweon et al. | |
| 6,916,580 B2 | 7/2005 | Cho et al. | |
| 7,135,252 B2 | 11/2006 | Thackeray et al. | |
| 7,303,840 B2 | 12/2007 | Thackeray et al. | |
| 2006/0051673 A1 | 3/2006 | Johnson et al. | |
| 2006/0099508 A1 | 5/2006 | Thackeray et al. | |
| 2007/0160906 A1* | 7/2007 | Tooyama et al. | 429/223 |

* cited by examiner

*Primary Examiner* — Ula C Ruddock
*Assistant Examiner* — Frank Chernow
(74) *Attorney, Agent, or Firm* — Lee & Morse, P.C.

(57) ABSTRACT

A cathode including an active material composite and a lithium battery using the same. The active material composite of the cathode includes a mixed oxide complex and a lithium-containing compound, the lithium-containing compound having a metal based compound coated on the surface of the lithium-containing compound.

2 Claims, 3 Drawing Sheets

CATHODE COMPRISING ACTIVE MATERIAL COMPOSITE AND LITHIUM BATTERY USING THE SAME

CROSS-REFERENCE TO RELATED APPLICATION

This application claims the benefit of Korean Application No. 2007-57441, filed Jun. 12, 2007 in the Korean Intellectual Property Office, the disclosure of which is incorporated herein by reference.

BACKGROUND OF THE INVENTION

1. Field of the Invention

Aspects of the present invention relate to a cathode comprising an active material composite and to a lithium battery using the same, and more particularly, to a cathode comprising an active material composite that can improve electrode performance by improving the conductivity characteristics during initial charging/discharging cycles, and to a lithium battery using the same.

2. Description of the Related Art

In general, transition metal compounds such as $LiNiO_2$, $LiCoO_2$, $LiMn_2O_4$, $LiFePO_4$, $LiNi_xCo_{1-x}O_2$ (0<x<1) and $LiNi_yMn_yCo_{1-2y}O_2$ (0<y<0.5), and oxides of these compounds and of lithium are widely used as cathode active materials for lithium batteries. Recently, various composite oxides have been proposed as alternatives to address the ever increasing demand for higher capacity batteries.

One such composite oxide, $xLi_2MO_3\text{-}(1-x)LiMeO_2$, is a solid-solution complex of $Li_2MO_3$ and $LiMeO_2$ where M is a group of metal elements including at least one of Mn, Zr, and Ti, and Me is a group of metal elements including at least one of Ni, Co, Mn, Cr, Fe, V, Al, Mg, and Ti. The complex, which is a solid-solution, has a layered structure, with respective layers of $Li_2MO_3$ and $LiMeO_2$, where excess lithium is substituted in a transition metal layer.

For example, in the case of the solid-solution complex component, $Li_2MO_3$, where manganese (Mn) is used as the transition metal M, Mn has an oxidation number of +4 during the charge cycle but the oxidation number of Mn in the oxygen layer is between +4 or +5, thus not permitting Mn to contribute to electric conductivity. In addition, if a battery has a capacity high enough to be feasible, lithium accounts for approximately 10 to 20 atomic percent of the composition of the transition metal layer. Because of the excess of lithium, Mn predominates at more than two times the content of lithium. Thus, the proportion of transition metals actually contributing to electric conductivity, e.g., Ni, Co, or the like, is restricted, resulting in a reduction in the electric conductivity of the cathode active material. Accordingly, in order to effectively utilize the $xLi_2MO_3\text{-}(1-x)LiMeO_2$ complex as a cathode active material, a need exists to solve the problem associated with electric conductivity of the complex.

SUMMARY OF THE INVENTION

Aspects of the present invention provide a cathode comprising a cathode active material having improved conductivity while using a $xLi_2MO_3\text{-}(1-x)LiMeO_2$ complex. Aspects of the present invention also provide a lithium battery using the cathode active material.

Another aspect of the present invention, provides a cathode including an active material composite, a complex represented by Formula 1, and a lithium-containing compound represented by Formula 2, the lithium-containing compound having a metal based compound coated on its surface, wherein Formula 1 is $xLi_2MO_3\text{-}(1-x)LiMeO_2$ 0<x<1, and M and Me are the same or different metal ions, wherein Formula 2 is $Li_{1+y}CO_{1-z}M'_zO_2$ and $-0.1 \leq y \leq 0.1$, $0 \leq z \leq 0.9$, and M' is at least one element selected from the group consisting of Al, Ni, Co, Mn, Cr, Fe, Mg, Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No, and Lr.

In one embodiment, in the complex represented by Formula 1, Me is preferably at least one metal selected from the group consisting of nickel (Ni), cobalt (Co), manganese (Mn) and chromium (Cr). In another embodiment, in the complex represented by Formula 1, M is preferably at least one metal selected from the group consisting of manganese (Mn), titanium (Ti) and Zr (zirconium). In another embodiment, in the complex represented by Formula 1, x preferably ranges from 0.1 to 0.6.

In another embodiment, the content of the lithium-containing compound represented by Formula 2 is preferably 1 to 60 wt % relative to the total weight of the cathode active material. In another embodiment, the content of the lithium-containing compound represented by Formula 2 is more preferably 3 to 50 wt % relative to the total weight of the cathode active material.

In another embodiment, in Formula 2, the metal based compound of the surface coating is preferably a metal oxide or a metal phosphate. In another embodiment, in Formula 2, the metal oxide is preferably at least one selected from the group consisting of $Al_2O_3$, MgO, $SiO_2$, $CeO_2$, $ZrO_2$ and ZnO.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
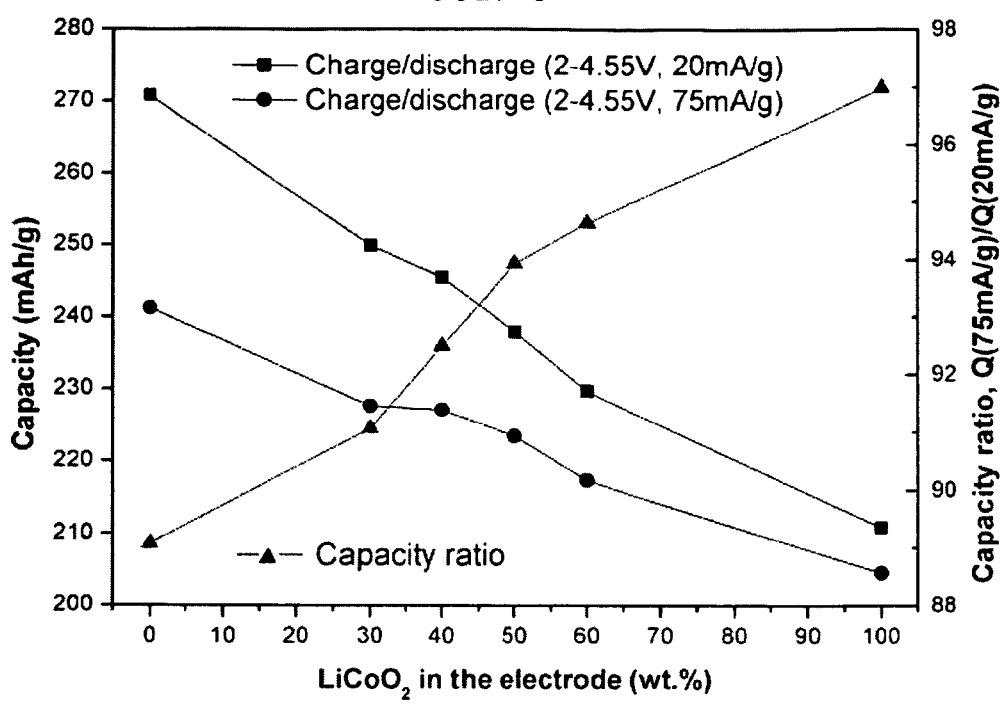
FIG. 1 is a graph illustrating current density expressed as capacity per weight (mAh/g) and capacity ratio as functions of various mixture ratios of $Li_{1.2}Ni_{0.133}Co_{0.133}Mn_{0.534}O_2$ and $Al_2O_3$-coated $LiCoO_2$ according to Examples 1 through 4 of aspects of the present invention and Comparative Examples 1 and 2.

Reference will now be made in detail to the present embodiments of the present invention, examples of which are illustrated in the accompanying drawings. The embodiments are described below in order to explain the present invention by referring to the figures.

Aspects of the present invention are characterized in that they provide a cathode comprising an active material composite that can improve electrochemical characteristics by adding a complex material to a lithium-containing compound having excellent conductivity and high-voltage stability. The active material composite according to these aspects include a complex represented by Formula 1, and a lithium-containing compound represented by Formula 2, the lithium-containing compound having a metal based compound coated on its surface, wherein:

$$xLi_2MO_3\text{-}(1-x)LiMeO_2 \quad (1)$$

$0<x<1$, and M and Me are the same or different metal ions; and $$Li_{1+y}Co_{1-z}M'_zO_2 \quad (2)$$

and $-0.1 \leq y \leq 0.1$, $0 \leq z \leq 0.9$, and M' is at least one element selected from the group consisting of Al, Ni, Co, Mn, Cr, Fe, Mg, Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No, and Lr.

The complex represented by Formula 1, which is a solid-solution, exhibits the same layered structure as each of the two components $Li_2MO_3$ and $LiMeO_2$, and exists in a form in which excess lithium is substituted in a transition metal layer.

In the complex represented by Formula 1, x defines the molar ratio of two components $Li_2MO_3$ and $LiMeO_2$, x being in the range between 0 and 1, preferably in the range between 0.1 and 0.6. In addition, M is at least one metal selected from the group consisting of manganese (Mn), titanium (Ti) and Zr (zirconium) and Me is at least one metal selected from the group consisting of nickel (Ni), cobalt (Co), manganese (Mn) and chromium (Cr).

The complex represented by Formula 1 used for the cathode active material according to this aspect of the present invention can be prepared by combustion synthesis. For example, a starting material in the form of a metal salt, e.g., carbonate, or acetate, is dissolved in an acidic solution to form a sol, and evaporated to remove moisture, yielding a gel, followed by combustion and post heat-treatment, thereby preparing a powder of the desired complex represented by Formula 1. Alternatively, the complex represented by Formula 1 can be prepared by a hydrothermal process under basic conditions using LiOH and/or KOH. Such processes are undertaken in a pressurized autoclave, preferably between 5 and 35 atmospheres and at temperatures ranging between 100 and 150° C. for about 6 to 12 hours or more.

Details as to the preparation process and physical properties of the complex represented by Formula 1 are disclosed in U.S. Pat. No. 6,677,082 and U.S. Published Application No. 2006/0051673, the disclosures of which are incorporated herein in their entirety by reference.

When the complex represented by Formula 1 is used as the cathode active material, a battery manufactured using the same may demonstrate reduced conductivity while providing high capacity. Therefore, aspects of the present invention provide a cathode active material having improved electrochemical characteristics by improving the conductivity characteristic using a cathode active material in the form of a combination or a complex containing the lithium-containing compound represented by Formula 2, which compound has excellent conductivity.

In order to impart a high capacity to the complex represented by Formula 1, lithium cells should be charged during an initial charge cycle at a high voltage of up to 4.5 V relative to Li. Oxidation of oxygen atoms at approximately 4.5 V during the initial charge cycle removes lithium ions from the composite, and after the initial charge cycle, a reversible reaction is carried out by a redox reaction of a metal contained in the composite, e.g., manganese. Accordingly, the lithium-containing compound represented by Formula 2 added for improving the conductivity is preferably a material demonstrating high-voltage stability at approximately 4.5 V.

To this end, it is beneficial to control reactivity of the lithium-containing compound represented by Formula 2 with respect to an electrolyte by surface-coating so as to allow the lithium-containing compound represented by Formula 2 to withstand a high voltage. In order to achieve this, according to aspects of the present invention, the surface of the lithium-containing compound represented by Formula 2 is coated with a metal based compound, thereby protecting the lithium-containing compound represented by Formula 2 at high-voltage. That is to say, the lithium-containing compound coated with the metal based compound demonstrates an improved structural stability by minimizing any anisotropic volume change due to intercalation/removal of lithium ions during charge/discharge cycles, thereby improving the cycle life of the battery at high-voltage.

Examples of the metal based compound used in surface coating for protecting the surface of the lithium-containing compound represented by Formula 2 include metal based oxides, metal based phosphates, and the like. Useful examples of the metal based oxides include, but are not limited to, at least one selected from the group consisting of $Al_2O_3$, MgO, $SiO_2$, $CeO_2$, $ZrO_2$ and ZnO. Useful examples of the metal based phosphates include, but are not limited to, $AlPO_4$.

A coating solution including at least one coating element is used in coating the cathode active material according to an aspect of the present invention. The coating solution is obtained by dissolving an alkoxide, salt or oxide containing the coating element in an organic solvent, and preferably refluxing the resulting mixture. Useful examples of the organic solvent include alcohols (such as methanol, ethanol or isopropanol), hexane, chloroform, tetrahydrofuran, ether, methylene chloride, or acetone. Throughout this specification, the term "coating solution" is used to mean both a solution and a homogenous suspension.

The coating is performing by adding the lithium-containing compound represented by Formula 2 to the coating solution prepared in the above-described manner. The simplest coating process is dip coating, but any other coating techniques such as a spray method, a sol-gel method, or the like, can be used. Coating of the metal based compound on the lithium-containing compound represented by Formula 2 may be carried out in either a non-continuous process or a single continuous ("one-shot") process.

The coated lithium-containing compound represented by Formula 2 is heat-treated to prepare a cathode active material having a surface coated with the metal based compound. The heat-treating process is preferably performed at a temperature ranging from 300 to 800° C. for 3 to 10 hours. Prior to the heat-treating process, a drying process may be further performed at a temperature ranging from 80 to 200° C. for 1 to 5 hours. When the heat-treatment temperature is lower than 300° C., discharge and lifespan improving effects for the battery are not exhibited. When the heat-treatment temperature is higher than 800° C., a poor coating is formed, undesirably, at the surface of the active material.

Details as to a preparation process and physical properties of the lithium-containing compound represented by Formula 2 are disclosed in U.S. Pat. Nos. 6,753,111 and 6,916,580, the disclosures of which are incorporated herein in their entirety by reference.

When the complex represented by Formula 1 and the lithium-containing compound represented by Formula 2 having a surface coated with the metal based compound are used as cathode active materials, these materials may first be pulverized to a predetermined particle size and then mixed before use. Alternatively, these materials may first be mixed together and then pulverized before use. In either case, an average particle size of the complex represented by Formula 1 is preferably not greater than 10 μm and also an average particle size of the lithium-containing compound represented by Formula 2 is preferably not smaller than 10 μm.

A process of manufacturing a lithium battery using the complex represented by Formula 1 and the lithium-containing compound represented by Formula 2 having a surface coated with the metal based compound used as cathode active materials, will now be described. First, a cathode active material, a conducting agent, a binder, and a solvent are mixed together to prepare a cathode active material composition. The cathode active material composition is directly coated on an aluminum current collector and dried to form a cathode plate. Alternatively, the cathode plate may be manufactured by laminating an aluminum current collector with a cathode active material film that has previously been formed by casting the cathode active material composition on a support and then separating the composition from the support.

As the conducting agent, carbon black can be used. Non-limiting examples of suitable binders include vinylidenefluoride/hexafluoropropylene copolymers, polyvinylidenefluoride (PVDF), polyacrylonitrile, polymethylmethacrylate, polytetrafluoroethylene and mixtures thereof. Styrene butadiene rubber polymers may also be used as the binder. Non-limiting examples of suitable solvents include N-methyl-pyrrolidone, acetone, water and the like. The cathode active material, the conducting agent, the binder and the solvent are used in amounts commonly used in lithium batteries.

In a similar manner to manufacture of the cathode plate, an anode active material, a conducting agent, a binder, and a solvent are mixed to prepare an anode active material composition. An anode plate is then prepared by directly coating the anode active material composition onto a copper foil and drying the anode active material composition. Alternatively, the anode active material composition is cast on a separate support to form an anode active material film, which is then released from the support and laminated onto the copper current collector. The anode active material, the conducting agent, the binder and the solvent are used in amounts commonly used in lithium batteries.

Examples of the anode active material include lithium metals, lithium alloys, carbonaceous materials, graphite, and the like. The same conducting agent, binder and solvent as those used in the cathode active material composition may be used in the anode active material composition. In one embodiment, a plasticizing agent may be further added into each of the cathode and anode active material compositions to form porous cathode and anode plates.

The cathode and the anode can be insulated from each other by a separator. Any separator commonly used in the manufacture of lithium batteries may be used as the separator. Particularly, preferred materials for the separator should have low resistance to ion movement of the electrolyte and good electrolyte impregnation properties. Specific examples of such separator materials include glass fiber, polyester, polyethylene, polypropylene, polytetrafluoroethylene (PTFE), and a combination of the foregoing materials, which may be in non-woven fabric or woven fabric form. As will now be described in greater detail. In the case of a lithium ion battery, a rolled separator made of polyethylene, polypropylene and the like, are used. Also, in the case of a lithium ion polymer battery, a separator having good electrolyte impregnation properties is used. These separators may be manufactured in the following manner.

First, a polymer resin, a filling agent, and a solvent are mixed together to prepare a separator composition. This separator composition is directly coated on an electrode and dried to form a separator. Alternatively, the separator may be formed by laminating the electrode with the separator, which is previously formed by casting the separator composition on a support and drying.

Any polymer resin that can be used as a binder for electrode plates may be used without limitation. Examples of the polymer resin include a polyvinylidenefluoride-hexafluoropropylene copolymer, PVDF, polyacrylonitrile, polymethacrylate, and a mixture of the foregoing materials. A preferred polymer resin is a vinylidenefluoride-hexafluoropropylene copolymer containing 8 to 25% by weight of hexafluoropropylene. Examples of the binder include PVDF-hexafluoropropylene copolymer, polyvinylidenefluoride, polyacrylonitrile, polymethymethacrylate, and mixtures thereof.

The separator is disposed between the cathode plate and anode plate manufactured as described above to form an electrode assembly. This electrode assembly is wound or folded and then sealed in a cylindrical or rectangular battery case. Next, the organic electrolytic solution according to aspects of the present invention is injected into the battery case so that a complete lithium secondary battery is obtained.

Alternatively, the electrode assembly may be stacked to form a bi-cell structure, which is then impregnated with the organic electrolyte solution and the resulting structure is sealed in a pouch, thereby obtaining a completed lithium ion polymer battery. An organic electrolyte solution for the lithium battery includes a lithium salt, and a mixed organic solvent consisting of a high dielectric constant solvent and a low boiling point solvent.

Any high dielectric constant solvent commonly used in the art may be used without limitation according to these aspects of the present invention and specific examples thereof include cyclic carbonates such as ethylene carbonate, propylene carbonate, or butylene carbonate, and γ-butyrolactone. Further, the low boiling point solvent is also commonly used in the art and nonlimiting examples thereof include carbonates such as dimethyl carbonate, ethyl methyl carbonate, diethyl carbonate, dipropyl carbonate, dimethoxyethane, diethoxyethane, fatty acid ester derivatives, and the like.

The high dielectric constant solvent and the low boiling point solvent are preferably mixed in a ratio of 1:1 to 1:9 by volume. If the volumetric ratio of the low boiling point solvent to the high dielectric constant solvent does not fall within the stated range, the lithium battery demonstrates undesirable characteristics of low discharge capacity, too few charge/discharge cycles and short lifespan.

In addition, the lithium salt is not particularly limited, provided that it is generally used for a lithium battery, and is preferably at least one selected from the group consisting of $LiClO_4$, $LiCF_3SO_3$, $LiPF_6$, $LiN(CF_3SO_2)_2$, $LiBF_4$, $LiC(CF_3SO_2)_3$, and $LiN(C_2F_5SO_2)_2$. The concentration of the lithium salt is preferably in the range of 0.5 to 2.0 M. If the concentration of the lithium salt is less than 0.5 M, the ionic conductivity of the electrolytic solution decreases, so that the performance of the electrolytic solution may be degraded. If the concentration of the lithium salt is greater than 2.0 M, the viscosity of the electrolytic solution increases, so that mobility of lithium ions is undesirably reduced.

Aspects of the present invention will now be described using the following examples. However, it is understood that the following examples are illustrative in nature and that the present invention is not limited thereto.

Comparative Example 1

Only sub-micron sized $Li_{1.2}Ni_{0.133}Co_{0.133}Mn_{0.534}O_2$, which is prepared by combustion synthesis, was used as a cathode active material. The cathode active material and a carbon conducting agent (KETJENBLACK® EC600-JD, Akzo-Nobel) were homogenized in a ratio of 94:3 by weight, and a PVDF binder solution was added thereto, producing a slurry containing the active material, the carbon conducting agent and the PVDF binder solution in a weight ratio of 94:3:3. The produced slurry was applied to a 15 μm thick aluminum (Al) foil and dried to form a cathode plate, followed by further drying in vacuum, thereby manufacturing a coin-type cell to perform charge/discharge tests.

Figure 2:
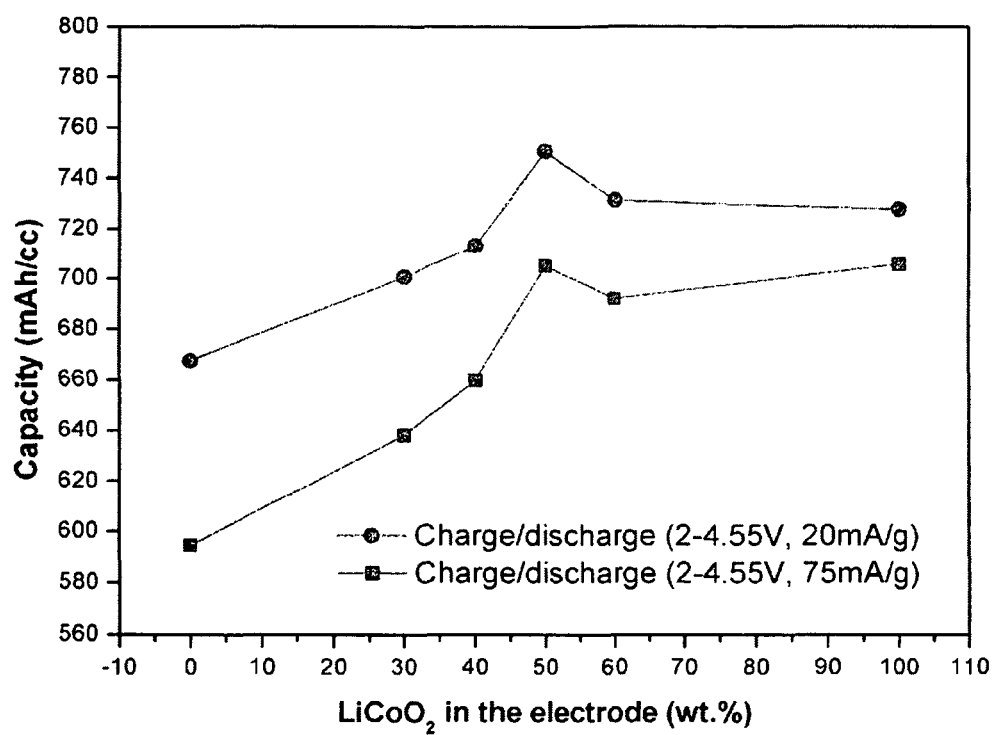
FIG. 2 is a graph illustrating f current density expressed as capacity per volume (mAh/cc) as a function of various mixture ratios of $Li_{1.2}Ni_{0.133}Co_{0.133}Mn_{0.534}O_2$ and $Al_2O_3$-coated $LiCoO_2$ according to Examples 1 through 4 of aspects of the present invention and Comparative Examples 1 and 2.
Figure 3:
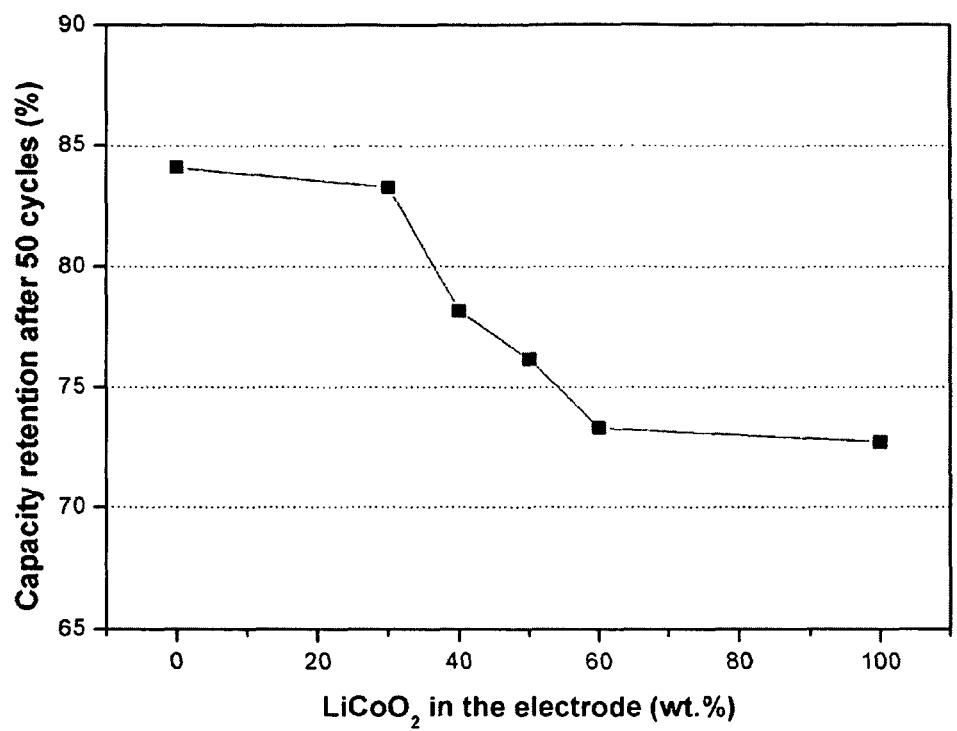
FIG. 3 illustrates the percentage of capacity retention after 50 cycles as a function of various mixture ratios of $Li_{1.2}Ni_{0.133}Co_{0.133}Mn_{0.534}O_2$ and $Al_2O_3$-coated $LiCoO_2$ according to Examples 1 through 4 of aspects of the present invention and Comparative Examples 1 and 2.

In the manufacture of the cell, lithium metal was used as a counter electrode and 1.3 M $LiPF_6$ in ethylene carbonate/diethylcarbonate (EC:DEC, 3:7) was used as an electrolyte. Constant current charging was performed at 20 mA/g and 4.55 V cut-off, constant voltage charging was performed, and the charged state was maintained until the current dropped to a level of approximately 2 mA/g. Constant current discharging was performed at approximately 2 mA/g and 2 V cut-off. After the first two cycles, the current density was raised to 75 mA/g and 50 charging/discharging cycles were repeated. The results of the charge/discharge tests are shown in FIGS. 1 through 3.

Comparative Example 2

An electrode was coated only with $Al_2O_3$-coated $LiCoO_2$ (synthesized by the method disclosed in U.S. Pat. No. 6,753,111). An active material and a carbon conducting agent (KETJENBLACK® EC600-JD) were homogenized in a ratio of 94:3 by weight, and a PVDF binder solution was added thereto, producing a slurry containing the active material, the carbon conducting agent and the PVDF binder solution in a weight ratio of 94:3:3. The produced slurry was applied to a 15 μm thick Al foil and dried to form a cathode plate, followed by further drying in vacuum, thereby manufacturing a coin-type cell to perform charge/discharge tests. In the manufacture of the cell, lithium metal was used as a counter electrode and 1.3 M LiPF6 in EC:DEC (3:7) was used as an electrolyte. Constant current charging was performed at 20 mA/g and 4.55 V cut-off, constant voltage charging was performed and the charged state was maintained until the current dropped to a level of approximately 2 mA/g. Constant current discharging was performed at approximately 2 mA/g and 2 V cut-off. After the first two cycles, the current density was raised to 75 mA/g and 50 charging/discharging cycles were repeated. The results of the charge/discharge tests are shown in FIGS. 1 through 3.

Example 1

Sub-micron sized $Li_{1.2}Ni_{0.133}Co_{0.133}Mn_{0.534}O_2$, which was prepared by combustion synthesis, and $Al_2O_3$-coated $LiCoO_2$ (synthesized by a method disclosed in U.S. Pat. No. 6,753,111 and commercially available), were mixed to be used to form a coating on an electrode surface. The amount of $LiCoO_2$ in the mixed active material was fixed at a level of 30 wt %. Conditions of preparing electrodes and cells, and charging/discharging conditions were the same as those in Comparative Examples 1 and 2. The results of the charge/discharge tests are shown in FIGS. 1 through 3.

Example 2

Sub-micron sized $Li_{1.2}Ni_{0.133}Co_{0.133}Mn_{0.534}O_2$, which was prepared by combustion synthesis, and $Al_2O_3$-coated $LiCoO_2$, (the commercially available product of Example 1), were mixed to be used to form a coating on an electrode surface. The amount of $LiCoO_2$ in the mixed active material was fixed at a level of 40 wt %. Conditions of preparing electrodes and cells, and charging/discharging conditions were the same as those in Comparative Examples 1 and 2. The results of the charge/discharge tests are shown in FIGS. 1 through 3.

Example 3

Sub-micron sized $Li_{1.2}Ni_{0.133}Co_{0.133}Mn_{0.534}O_2$, which is prepared by combustion synthesis, and $Al_2O_3$-coated $LiCoO_2$, (the commercially available product of Example 1), were mixed to be used to form a coating on an electrode surface. The amount of $LiCoO_2$ in the mixed active material was fixed at a level of 50 wt %. Conditions of preparing electrodes and cells, and charging/discharging conditions were the same as those in Comparative Examples 1 and 2. The results of the charge/discharge tests are shown in FIGS. 1 through 3.

Example 4

Sub-micron sized $Li_{1.2}Ni_{0.133}Co_{0.133}Mn_{0.534}O_2$, which is prepared by combustion synthesis and $Al_2O_3$-coated $LiCoO_2$, (the commercially available product of Example 1), were mixed to be used to form a coating on an electrode surface. The amount of $LiCoO_2$ in the mixed active material was fixed at a level of 60 wt %. Conditions of preparing electrodes and cells, and charging/discharging conditions were made the same as those in Comparative Examples 1 and 2. The results of the charge/discharge tests are shown in FIGS. 1 through 3.

FIG. 1 is a graph illustrating current density expressed as capacity per weight (mAh/g) and capacity ratio as functions of various mixture ratios of $Li_{1.2}Ni_{0.133}Co_{0.133}Mn_{0.534}O_2$ and $Al_2O_3$-coated $LiCoO_2$ according to Examples 1 through 4 of aspects of the present invention and Comparative Examples 1 and 2. FIG. 2 is a graph illustrating current density expressed as capacity per volume (mAh/cc) as a function of various mixture ratios of $Li_{1.2}Ni_{0.133}Co_{0.133}Mn_{0.534}O_2$ and $Al_2O_3$-coated $LiCoO_2$ according to aspects of the present invention and Comparative Examples 1 and 2.

As is evident from FIG. 1 the cathode active materials in Examples 1 through 4 of aspects of the present invention were superior to those in Comparative Examples 1 and 2 from the viewpoints of both the capacity per weight and the capacity per volume. The cathode active material in Comparative Example 1, in which only $Li_{1.2}Ni_{0.133}Co_{0.133}Mn_{0.534}O_2$ was used, had a good weight capacity but showed a noticeable reduction in the capacity per volume. The cathode active material in Comparative Example 2, in which only $Al_2O_3$-coated $LiCoO_2$ was used, showed a noticeable reduction in the capacity per weight while maintaining a predetermined level of capacity per volume.

FIG. 3 illustrates the percentage of capacity retention after 50 cycles as a function of various mixture ratios of $Li_{1.2}Ni_{0.133}Co_{0.133}Mn_{0.534}O_2$ and $Al_2O_3$-coated $LiCoO_2$ according to Examples 1 through 4 of aspects of the present invention and Comparative Examples 1 and 2. In Examples 1 through 4, more than 70% of the initial capacity was maintained after 50 cycles, suggesting that the cells of Examples 1 through 4 had commercially acceptable levels of capacity retention.

According to aspects of the present invention, a cathode is capable of improved conductivity while maintaining a high capacity by adding a lithium-containing compound having improved conductivity to an active material composite. In particular, the life span can be enhanced by improving high-voltage stability. A lithium battery employing the cathode according to these aspects of the present invention allows for an easier cell design relative to a counter electrode, thereby further increasing commercial availability of a high-capacity cathode active material.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cathode comprising an active material composite, the active material composite including:
   $Li_{1.2}Ni_{0.133}Co_{0.133}Mn_{0.534}O_2$ and,
   $LiCoO_2$ having $Al_2O_3$ coated on its surface, the $LiCoO_2$ being included in an amount of 30 to 60 wt %, based on a total weight of the active material composite.

2. A lithium battery comprising:
   the cathode of claim 1;
   an anode; and
   an organic electrolytic solution.

* * * * *